United States Patent [19]

Tatterson et al.

[11] 4,280,898
[45] Jul. 28, 1981

[54] FLUID CATALYTIC CRACKING OF HEAVY PETROLEUM FRACTIONS

[75] Inventors: David F. Tatterson; Iacovos A. Vasalos, both of Downers Grove, Ill.

[73] Assignee: Standard Oil Company (Indiana), Chicago, Ill.

[21] Appl. No.: 91,470

[22] Filed: Nov. 5, 1979

[51] Int. Cl.³ ........................ C10G 9/16; C10G 11/05
[52] U.S. Cl. .............................. 208/119; 208/52 CT; 208/113; 208/120; 252/411 R; 252/454; 252/457; 252/459
[58] Field of Search ................................ 208/113, 120

[56] References Cited

U.S. PATENT DOCUMENTS

| 2,394,710 | 2/1946 | McAfee | 208/118 |
| 4,013,546 | 3/1977 | Suggitt et al. | 252/415 |
| 4,146,463 | 3/1979 | Radford et al. | 208/120 |
| 4,200,520 | 4/1980 | Gladrow et al. | 208/120 |

FOREIGN PATENT DOCUMENTS 2001545  2/1979  United Kingdom ..................... 252/419

OTHER PUBLICATIONS

Cimbalo et al. "Deposited Metals Poison FCC Catalyst", Oil Gas Journal, May 15, 1972, pp. 112-122.

Primary Examiner—Delbert E. Gantz
Assistant Examiner—G. E. Schmitkons
Attorney, Agent, or Firm—William C. Clarke; William T. McClain; William H. Magidson

[57] ABSTRACT

A process for fluid catalytic cracking of residuum and other heavy oils comprising gas oil, petroleum residue, reduced and whole crudes and shale oil with high metals contents wherein contaminant metals comprising nickel, vanadium, copper and iron are deactivated, organic sulfur compounds deposited on the cracking catalyst are removed, wherein the said contaminant metals are deactivated by contact with a high temperature reducing atmosphere comprising carbon monoxide in a range of from about 4 to about 14 volume percent, the temperature being at least 900° F. and preferably greater than 1200° F., wherein the catalyst is modified with at least one inorganic sulfur oxide absorbent which reacts with sulfur oxides under regeneration conditions to form non-volatile inorganic sulfur compounds, the said sulfur oxide absorbent being present in sufficient amount to effect said reduction of said sulfur oxides.

18 Claims, 2 Drawing Figures

FLUID CATALYTIC CRACKING OF HEAVY PETROLEUM FRACTIONS

BACKGROUND OF THE INVENTION

The present invention concerns a fluid catalytic cracking process wherein (a) residuum and other heavy oils with high metals contents are cracked to produce useful products, (b) contaminant metals on the catalyst are deactivated and (c) sulfur oxides produced during catalyst regeneration are absorbed by the cracking catalyst in sufficient amount to effect a reduction of sulfur oxides in the flue gas.

The catalytic cracking of various heavier mineral hydrocarbons, for instance, petroleum or other mineral oil distillates such as straight run and cracked gas oils; petroleum residues, etc., has been practiced for many years. As is well known, "gas oil" is a broad, general term that covers a variety of stocks. The term includes light gas oil (boiling range 400° to 600° F.), heavy gas oil (boiling range 600° to 800° F.) and vacuum gas oils (boiling range 800° to about 1100° F.). The petroleum residues have a boiling range from about 1100° F. and up. The vacuum gas oils and residuals together represent the atmospheric reduced crude.

A residual stock is in general any petroleum fraction with a higher boiling range than gas oils. Any fraction, regardless of its initial boiling point, which includes the heavy bottoms, such as tars, asphalts, or other undistilled materials can be termed a residual fraction. Accordingly, a residual stock can be the portion of the crude remaining undistilled at about 1050°–1200° F., or it can be made up of a vacuum gas oil fraction plus the portion undistilled at about 1050°–1200° F. For instance, a topped crude may be the entire portion of the crude remaining after the light ends (the portion boiling up to about 400° F.,) have been removed by distillation. Therefore, such a fraction includes the entire gas oil fraction (400° F. to 1050°–1200° F.) and the undistilled portion of the crude petroleum boiling above 1050°–1200° F.

The behavior of a hydrocarbon feedstock in the cracking reactions depends upon various factors including its boiling point, carbon-forming tendencies, content of catalyst contaminating metals, etc. and these characteristics may affect the operation to an extent which makes a given feedstock uneconomical to employ. Although the cracking catalyst employed can be discarded to prevent a accumulation of poisoning metals in the cracking system, this type of operation represents a substantial cost factor. Improvements in the regeneration of catalysts become even more important as the cost of the catalyst rises and thus the effects of low feedstock quality are less burdensome.

Metallic contaminants are found as innate constituents in practically all crude oils. Upon fractionation of the crudes, the metallic contaminants are concentrated in the residua which normally have initial boiling points of about 1000° F. Such residua are conventionally used as heavy fuels, and it has been found that the metal contaminants therein adversely affect the combustion equipment in which the residua are burned. The contaminants not only form ash, which leads to sludging and the formation of deposits upon boiler tubes, combustion chamber walls, the gas turbine blades, but also attack the refractories which are used to line boilers and combustion chambers and severely corrode boiler tubes and other metallic surfaces with which they come into contact at high temperatures.

Efforts of petroleum refiners to employ heavier fractions of crude oil for catalytic cracking have been handicapped due to the heavy coke laydowns experienced in cracking such feedstocks. Coke build-up in catalytic cracking is caused by a number of factors. The presence of high-boiling aromatics and other hydrocarbon coke-formers in the feed contribute to excess coke formation. In high boiling feedstocks these problems are severe since these fractions contain higher proportions than conventional gas-oil feedstocks of coke formers and metal contaminants, which diminish the selectivity of the catalyst. The higher boiling fractions of many crude oils contain substantial portions of metal contaminants, particularly nickel and vanadium components. These metals deposit on the catalyst during the conversion processes so that regeneration of the catalyst to remove coke does not remove these contaminants. This catalyst poisoning modifies the selectivity of a cracking catalyst, causing the catalyst to convert part of the hydrocarbons in the feed to hydrogen and coke rather than the desired light hydrocarbon product. In some commercial operations coke production frequently becomes so severe, due to catalyst poisoning, as well as coke-formers in the feed, that the feed rate or conversion must be reduced to maintain operations with the unit limitations. It is to be understood, therefore, that the problems of catalyst contamination and coke formation prevent full exploitation of heavy feeds.

Contaminant metals in crudes occur naturally. Although traces of most metals have been found in crude oil, the most abundant heavy metals are vanadium, nickel, iron and copper. These metals are catalysts themselves and catalyze dehydrogenation of hydrocarbons and aromatic condensations when deposited upon the cracking catalyst. Any metal poisons in a fluid catalytic cracker feed, even very small concentrations, will deposit almost quantitatively on the cracking catalyst. These deposits can accumulate to very high levels, eventually causing lowered catalyst performance, increased coke deposits and gas make.

A higher level of metals in feeds is a natural result of processing the heavier, more asphaltenic crudes. For instance, the bulk of metals originally present in a crude will eventually become concentrated in residua such as vacuum-tower bottoms. However, gross metals content cannot be used as a measure of contamination since not all deposited metals are equally effective in producing coke and hydrogen. On a weight basis, nickel and copper are the strongest dehydrogenation catalysts, nickel and copper being about four times as strong as vanadium and about six times as strong as iron. (H. R. Grane, et al., *Petrol. Refiner*, 40, 5, 170) Copper, however, is typically in very low concentration in feedstocks. Iron which is picked up in vessels and lines due to corrosion and erosion is commonly considered as scale or "tramp" metal and has not been considered as a significant catalyst contaminant.

It is well-known that freshly deposited metals are more active as poisons than "older" metals that have been subjected to numerous cycles in the regenerator-reactor circuit. Upon exposure to such repeated cycles of oxidation/reduction, the poisoning effects of metals contaminants are slowly diminished, but there are some claims that those metals on zeolite catalysts lose their effectiveness more slowly than those on amorphous catalysts (*Oil Gas J.* 70, (20), 112 (1972)).

Sulfur is also typically present in a reduced crude or residual oil. During the cracking process, some of this sulfur is deposited in the coke which is produced by the cracking process. During the conventional regeneration process sulfur oxides are produced during oxidation of the coke to carbon dioxide.

In the residual oil cracking process, the catalyst material is typically withdrawn continuously from the cracking unit and sent to a regenerator where the coke is burned off. High coke yields from cracking residual oils requires removal of a large quantity of excess energy as heat from the regenerator. When the coke is burned in the regenerator, the sulfur content of the coke is converted to sulfur oxides which are emitted in the flue gas and this may necessitate stack gas scrubbing or some other means of control. The contaminant metals remain on the catalyst and continue to catalyze coking-dehydrogenation reactions unless deactivation or removal of these metals takes place. Moreover, although catalytic cracking of residual oils can be more attractive than other processes for utilizing the residual oils, an extremely large economic investment can be required because of the necessity of auxiliary means of removing the excess heat generated by the combustion of the coke in excess of the reactor requirements.

An accompanying problem is the economic investment required for regenerator stack gas scrubbing. When this coke is burned in the regenerator of a catalytic cracker, this sulfur is converted to sulfur oxides. Several cracking catalysts have been developed to reduce sulfur oxide emissions in the flue gas emitted from the fluid catalytic cracking unit, obviating the need for a stack scrubber. In order for these sulfur oxide catalysts to function properly, it is necessary to have an excess of oxygen during the regeneration of the fluid catalytic cracker, more oxygen than is necessary to burn all the coke generated by the cracking process.

In the prior art, it is well-known that the yield of gasoline in the catalytic cracking process decreases with an increase in the coke factor of a catalyst. Duffy and Hart (*Chem. Eng. Progr.* 48, 344 (1952)) reported that yields of gasoline, based on feed disappearance, dropped when the laboratory-measured coke factor of a catalyst rose from 1.0 to 3.0 in commercial cracking of a feedstock containing highly contaminated stocks. This decreased gasoline yield was matched by an equal increase in gas and coke, the metal contaminants being nickel and vanadium. It has also been theorized that metal contaminants, such as iron, nickel, vanadium and copper markedly alter the character of the cracking reactions. Connor, et al., *I.& E.C.,* 49, No. 2, 281 (1957) teach that the aforesaid metals, when deposited upon the surface of cracking catalysts superimpose their dehydrogenation activity in the cracking reactions and convert into carbonaceous residue and gas some of the material that would ordinarily go into gasoline. Connor indicates an additional explanation to explain the variables affecting the carbon-producing factors of a contaminated catalyst, namely, that the degree of dispersion of the metal over the surface of the catalyst, the higher the carbon-producing factor. Connor indicates these factors are approximately inversely proportional to initial surface area and that the carbon producing factor increases with the proportion of catalyst surface area covered by the contaminant. However, as noted above, in the case of iron particularly, some of the "tramp" metal originating from corrosion and other foreign sources is relatively inert as a contaminant and does not promote dehydrogenation or affect selectivity (H. R. Grane, et al, *Petrol. Ref.* 40, No. 5 (1961) 170). The detrimental effect of the so-called "tramp metals" and other metals in dissolved or suspended form in the feedstock or originating in corrosion of equipment can be suppressed by use of a reducing gas on a silica-alumina catalyst. (U.S. Pat. No. 2,575,258). When these metals other than as tramp metals exist in organic forms and in low concentrations, their removal can be extremely difficult without adverse effects on other desirable catalyst properties (*Oil & Gas. J., p.* 75, Dec. 11, 1961). Grane reported, op. cit, that when catalysts containing these metals are exposed to the alternating oxidizing and reducing cycles of the regenerator and of the reactor, the activity of the metal contaminants in coke formation decreased but that an increase in oxygen from 4 to 21 percent or length or temperature of the regeneration cycle had little effect. A repeat program carried out at 1050° F. instead of 900° F. gave almost the same results.

Foster, U.S. Pat. No. 3,122,511, teaches demetallization of a silica-alumina cracking catalyst where the hydrocarbon feed is highly contaminated with nickel, iron and/or vanadium by treating the catalyst with a sulfiding vapor, chlorinating the catalyst, followed by washing with an aqueous medium. Connor, et al., U.S. Pat. No. 3,123,548, teaches removal of metallic impurities from silica-alumina cracking catalyst with use of hydrogen sulfide gas at an elevated temperature, then with molecular oxygen and a suspension of a cation exchange resin in an aqueous medium. Similarly, methods are taught in U.S. Pat. Nos. 3,539,290 (elevated oxidizing temperature and fluid wash); 3,073,675 (an ion-exchange process); 3,162,595 (solvent extraction); French Pat. No. 1,363,355 (an ion-exchange process) (CA, 62, 7563c); Belgian Pat. No. 626,409 (an ion-exchange process) (CA, 60, 9080d); U.S. Pat. No. 3,293,192 (regeneration of zeolite catalysts with steam and/or temperatures of 1300°–1700° F.); U.S. Pat. No. 3,008,896 (regenerating used catalysts from residual oils by a stripping gas or medium); U.S. Pat. No. 3,041,270 (an ion-exchange process).

The primary object of this invention accordingly is to provide a fluid cracking process for proper utilization of cracking catalysts used in processing heavy oils such as residual oil, reduced and whole crudes, gas oil, shale oil, etc. wherein metals deposited on the catalyst are rapidly deactivated concurrently with a reduction of sulfur oxide emissions during the fluid catalytic cracking process.

Another object of this invention is to provide a process wherein sulfur oxide emissions from the fluid catalytic cracking process are reduced by absorption by the catalyst.

Another object of this invention is to provide a process wherein sulfur oxide absorbent cracking catalysts are subjected to an oxidizing atmosphere having an excess of oxygen present.

Another object of this invention is to provide a process for the catalytic cracking of heavy, asphaltenic crudes containing high levels of heavy metals. Another object is to reduce the coke factor of the cracking catalyst and thus increase yields of gasoline from the cracking stock.

These and other objects and advantages of the present invention will become clear from the following specification. These objects have been attained using the process of the present invention.

SUMMARY OF THE INVENTION

A fluid catalytic cracking process for heavy hydrocarbon feed stocks wherein (a) residuum and other heavy oils are cracked, (b) contaminant metals on the catalyst are deactivated and (c) sulfur oxide emissions in the flue gases are reduced by absorption on the cracking catalyst.

DETAILED DESCRIPTION OF THE INVENTION

A process for fluid catalytic cracking of residuum and other heavy oils wherein the contaminant metals are deactivated and sulfur oxide emissions are reduced. The metals deactivation, the coke combustion and the removal of the sulfur compounds as sulfur oxides can take place in a single regenerator vessel or, alternately, in a metals deactivation vessel followed by a carbon monoxide boiler for the flue gas, the catalyst being removed from the metals deactivation vessel for transfer to the regenerator to burn off the remainder of the coke. The sulfur oxides are removed in the regenerator by the cracking catalyst. The stack gas from the carbon monoxide boiler goes to a stack gas scrubber to remove the remaining sulfur oxides. The regenerated catalyst is thereupon returned to the residual oil cracker.

Figure 1:
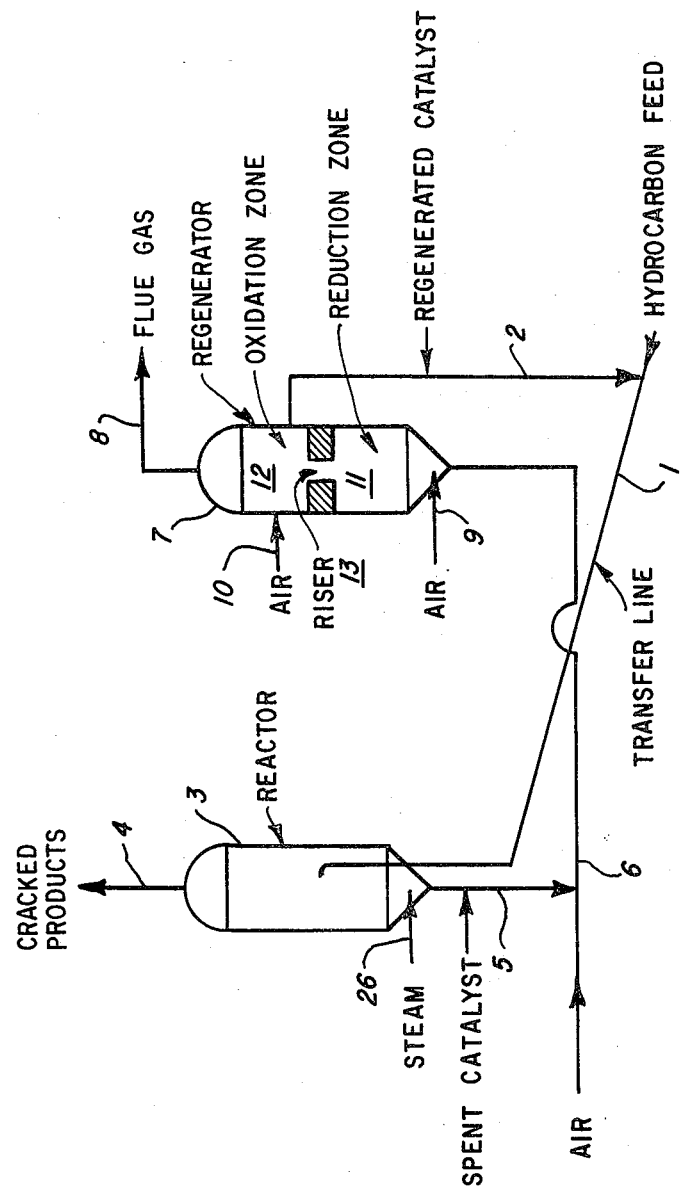
FIG. 1 is a schematic illustration of one embodiment of the invention according to which the residuum feed undergoes catalytic cracking and wherein the metals deactivation, the sulfur oxides removal and the coke burning are obtained in a single regenerator vessel.

The catalyst from the metals deactivation vessel is transferred to the regenerator to burn off the remainder of the coke from the catalyst. Operation wherein the metals deactivation is carried out in a separate vessel permits the advantage of flexibility of using the flue gas from the metals deactivation vessel as feed to the regenerator vessel (dotted line in FIG. 2) or, alternatively, not using the flue gas as feed to the regenerator, in burning the remaining coke off the catalyst.

The essence of the invention is that advantage is taken of (1) the ability of a reducing atmosphere at a concentration of from about 4 to about 14 volume percent of carbon monoxide at high temperatures to accelerate deactivation of contaminant metals and which is followed by a high temperature oxidizing atmosphere wherein the oxygen concentration in the flue gas is greater than 0.1 volume percent and (2) the ability of the cracking catalyst to reduce sulfur oxide emissions. It has been found that alternate high temperature reducing and oxidizing atmospheres quickly deactivate contaminant metals. The rate of this deactivation process is accelerated greatly by increasing the temperature of the catalyst in the reducing and oxidation atmospheres. Temperatures in the reducing atmosphere above 900° F. are necessary to accelerate the deactivation rate, preferably about 1,250° F. to about 1,450° F.

The hydrocarbon feed can be any stock which contains at least a major or at least a substantial fraction which cannot be vaporized at atmospheric pressure without extensive decomposition. Such stocks can be of virgin nature such as atmospheric residua, vacuum residua, whole crudes, or they may be cycle stocks such as visbreaker tar or clarified oil obtained as bottoms upon fractionation of catalytically cracked gas oil, shale oil, and so on. In general, stocks used as feeds in the present invention will be characterized by a boiling range extending well above 1,000° F. to as much as 1,300° F. However, typically the feed can have a boiling point within the range of from about 650° F. to 1,100° F., a gravity of about $-10°$ to 20° API, and a Conradson carbon content of about 5 to 40 weight percent. Metals content of iron, nickel, copper and vanadium typically can be high. Metals content of the feed can be as high as 50 parts per million (ppm) of nickel, 100 ppm of vanadium, 50 ppm of copper and 200 ppm of iron. Metal deposits on the used catalyst can be present in concentrations up to 10,000 ppm of nickel, 10,000 ppm of vanadium, 10,000 ppm of iron, 5,000 ppm of copper, individually and as mixtures thereof.

A suitable hydrocarbon feedstock for use in the process can contain from 0.2 to 12 weight percent of sulfur in the form of organic sulfur compounds. Typically, the feedstock contains from about 0.5 to 5 weight percent sulfur where the sulfur is present in the form of organic sulfur compounds.

Suitable hydrocarbon cracking catalysts for use in the practice of this invention include all high-activity solid catalysts which possess thermal stability under the required conditions. Suitable catalysts include those of the amorphous silica-alumina type having an alumina content of about 10 to about 65 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite type cracking catalysts are preferred because of their thermal stability and high catalytic activity.

The crystalline aluminosilicate or zeolite components of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007) and ultrastable large-pore zeolites (U.S. Pat. Nos. 3,293,192 and 3,449,070). The crystalline aluminosilicates have a faujasite-type crystal structure are particularly suitable and include natural faujasite, Zeolite X and Zeolite Y. These zeolites are usually prepared or occur naturally in the sodium form. The presence of this sodium can be undesirable, however, since the sodium zeolites have a low stability under hydrocarbon cracking conditions. Consequently, for use in this invention the sodium content of the zeolite is ordinarily reduced to the smallest possible value, generally less than about 1.0 weight percent and preferably below about 0.3 weight percent through ion exchange with hydrogen ions, hydrogen-precursors such as ammonium ion, or polyvalent metal cations including calcium, magnesium, strontium, barium and the rare earth metals such as cerium, lanthanum, neodymium and their mixtures. Suitable zeolites are able to maintain their pore structure under the high temperature conditions of catalyst manufacture, hydrocarbon processing and catalyst regeneration. These materials have a uniform pore structure of exceedingly small size, the cross-section diameter of the pores typically being in the range from about 4 to about 20 angstroms. Catalysts having a larger cross-section diameter can also be used.

The matrix of the zeolite-type cracking catalyst is a porous refractory material within which the zeolite component is dispersed. Suitable matrix and materials can be either synthetic or naturally occurring and include, but are not limited to, silica, alumina, magnesia, boria, bauxite, titania, natural and treated clays, kieselguhr, diatomaceous earth, kaolin and mullite. Mixtures of two or more of these materials are also suitable. Particularly suitable matrix materials comprise mixtures of silica and alumina, mixtures of silica with alumina and magnesia, and also mixtures of silica and alumina in combination with natural clays and clay-like materials. Mixtures of silica and alumina are preferred, however, and contain preferably from about 10 to about 65 weight percent of alumina mixed with from about 35 to about 90 weight percent of silica, and more preferably from about 25 to about 65 weight percent of alumina mixed with from about 35 to about 75 weight percent of silica.

A preferred embodiment of this invention involves either the incorporation of a sulfur oxide absorbent into the particles of the cracking catalyst or as an admixture of a separate particular sulfur oxide absorbent. Preferred embodiments of sulfur oxide absorbents useful in this invention are taught in U.S. Pat. Nos. 4,153,534; 4,153,535; 4,152,298; 4,115,250; and 4,071,436 which are incorporated by reference.

The method of this invention can be employed in any conventional fluid catalytic cracking scheme wherein the feedstock is subjected to cracking in a reaction zone in contact with fluidized solid particles comprising cracking catalyst at a temperature from about 850° F. to 1500° F.

A metallic reactant such as sodium, scandium, titanium, chromium, molybdenum, manganese, cobalt, nickel, antimony, copper, zinc, cadmium, the rare earth metals, lead, their compounds, and mixtures thereof in free and combined form is present in sufficient average amount in the regeneration zone to absorb a major portion of the sulfur oxides produced by the burning of sulfur-containing carbonaceous deposits therein. More preferably, the metallic reactant consists of at least one free or combined metallic element which is selected from the group consisting of sodium, chromium, manganese, copper, zinc, and cadmium. Most preferably, the metallic reactant consists of at least one free or combined metallic element which is selected from the group consisting of sodium, manganese, and copper. At least about 50%, and advantageously more than about 80% of the sulfur oxides produced by such burning are absorbed by the metallic reactant in the regeneration zone. As a result, the concentration of sulfur oxides in the regeneration zone effluent gas stream from this novel process can be maintained at less than about 600–1000 parts per million by volume (ppmv), advantageously at less than about 600 ppmv, and more advantageously at less than about 400 ppmv.

In the method of this invention, the feedstock to the reactor is preheated to a suitable temperature by means which are not shown in FIGS. I or II and then is transported into the transfer-line wherein the feedstock contacts the catalyst introduced from the regenerator vessel. The feedstock is cracked at a temperature within the range from about 850° F. to about 1500° F. The ratio of catalyst to oil on a weight basis should be in the range of 3:1 to 30:1. Usually the oil feed contains steam for obtaining good feed dispersion. When the dispersion contacts the catalyst, a portion of the oil feed is vaporized and this plus the dispersion steam serves to circulate the catalyst.

The gas-liquid cracking products and overhead from the reactor are passed to a fractionator not shown in FIGS. I and II for further processing. The coked catalyst is passed into a regenerator, as in FIG. 1, or into a metals deactivation vessel, as in FIG. 2.

Referring to FIG. I, the residual oil is introduced by line 1 to the process and contacts the catalyst from line 2 in the transfer line prior to entering the reactor 3, the overhead of reactor 3 passing to a fractionator (not shown) by line 4. Steam is introduced into reactor 3 by line 26. Bottoms from the reactor 3 comprising spent coked catalyst are transported by line 5 to line 6 wherein the spent coked catalyst is introduced to the regenerator 7. Flue gases from regenerator 7 are passed to an electrostatic precipitator (not shown) for particulate matter removal by line 8. Air is introduced to the regenerator 7 by line 9 and line 10.

Referring to FIG. 1, it is essential that the regenerator is divided into two sections, 11 and 12. In the lower metals reduction section 11, the outlet concentration of oxygen in gas in the internal riser 13 is at a minimal or zero level. Introduction of air by the spent catalyst lift line 6 and by line 9 is controlled to produce the required minimum to zero concentration of oxygen in the internal riser gas. Line 9 is used to add additional air as required. Concentration of carbon monoxide in the gas from the lower metals reduction section 11 is high, within the range of from about 4 to about 14 volume percent, preferably from 8 to 14 volume percent, most preferably at about 10 volume percent. Coke deposits on the coked catalyst before regeneration can range from about 0.7 weight percent to about 5.0 weight percent. Typically the coke deposits on the coked catalyst are reduced from a range of about 0.7 weight percent to about 5.0 weight percent to a range from about 0.01 weight percent to about 0.5 weight percent. The temperature in lower metals reduction section 11 of regenerator 7 is within the range from about 900° F. to about 1,450° F., preferably in the range from about 1,100° to about 1,450° F. and most preferably in the range from about 1,200° F. to about 1,450° F. The partially decoked catalyst then flows up the internal riser 13 into the upper metals oxidation section 12 of the regenerator. The gas from the lower metals reduction section 11 also passes up this riser 13 into the upper metals oxidation section 12 of the regenerator 7. Air is added in sufficient quantity by line 10 to burn the remainder of the coke on the catalyst and to raise the excess oxygen in the flue gas in line 8 to over 0.1 volume percent, preferably over 1.0 volume percent. Full carbon monoxide combustion occurs in the upper metals oxidation section 12 of the regenerator vessel, and with combustion of the coke on the catalyst provides heat for the regenerated catalyst going to line 2. Temperature in the oxidation section 12 is within the range of from about 900° F. to about 1,600° F., preferably in the range from about 1,100° F. to about 1,600° F., and most preferably in the range of from about 1,200° F. to 1,600° F. Temperatures higher than 1,600° F. can also be used. The sulfur oxides generated by the combustion of coke in sections 11 and 12 of regenerator 7 are removed by the sulfur oxide absorbents on the particles of the cracking catalyst in section 12 of the regenerator.

Figure 2:
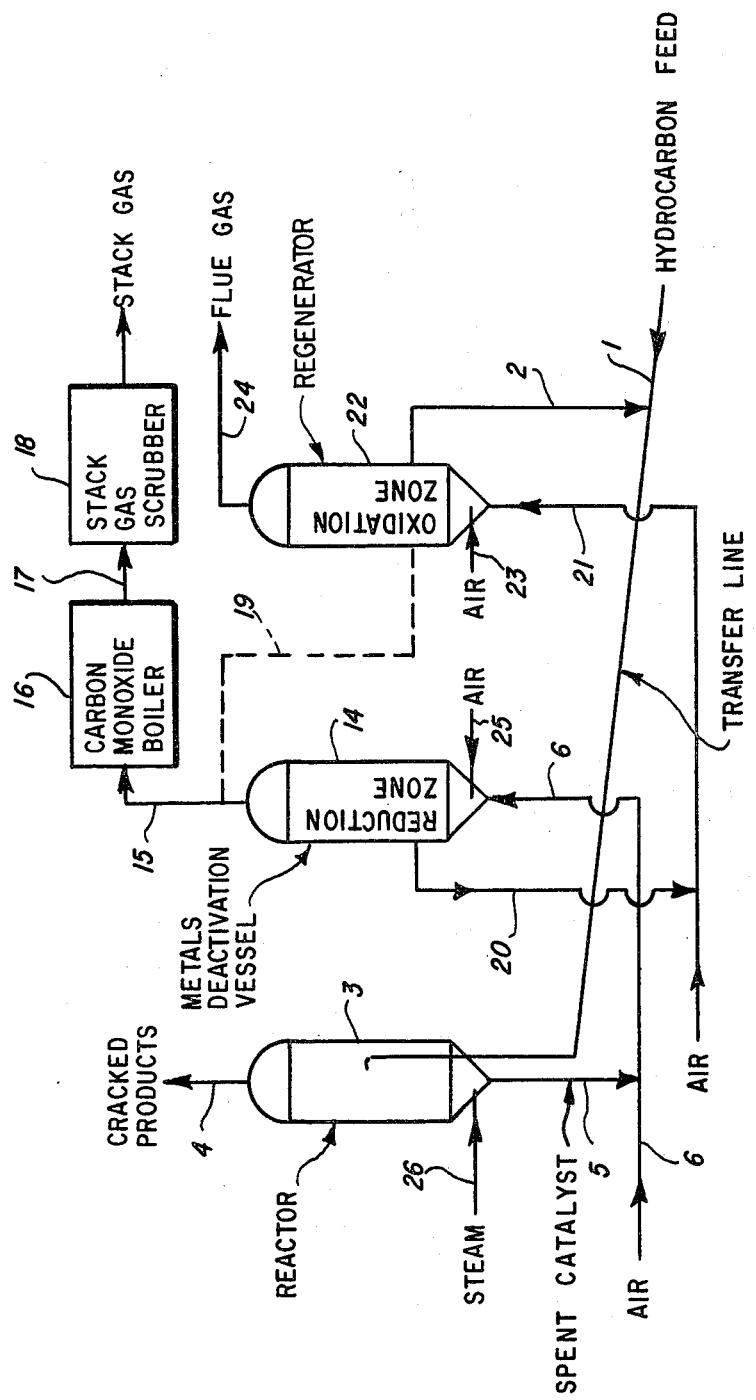
FIG. 2 is a schematic illustration of an alternative embodiment of the invention wherein the residuum feed is catalytically cracked, the metals deactivation is carried out in a separate metals deactivation vessel, and the sulfur oxides are removed in a separate regenerator vessel.

Referring to FIG. 2, the residual oil is introduced by line 1 to the process, and contacts the catalyst from line 2 in the transfer line prior to entering the reactor 3, the overhead of reactor 3 passing to a fractionator (not shown) by line 4. Steam is introduced into reactor 3 by line 26. Bottoms from the reactor 3 comprising spent catalyst are transported by line 5 to line 6 wherein the spent coked catalyst is introduced to the metals deactivation vessel 14. Introduction of air by line 25 is controlled to produce the required minimal to zero concentration of oxygen in the flue gas from the metals deactivation vessel 14. Flue gases from metals reduction vessel 14 are passed to a carbon monoxide boiler vessel 16 by line 15 and thence to a stack gas scrubber 18 by line 17. Flue gas from the metals reduction vessel 14 can alternatively be passed by line 19 to regenerator vessel 22 as a source of heat. The partially decoked catalyst removed as bottoms from metals deactivation vessel 14 by line 20 is air-lifted by line 21 to the regenerator vessel 22. Additional air is introduced as required into regenerator vessel 22 by line 23 to burn the remainder of the coke on the catalyst and to raise the excess oxygen in the flue gas from vessel 22 in line 24 to over 0.1 volume percent, preferably over 1.0 volume percent. Flue gases from vessel 22 are passed to an electrostatic precipitator (not shown) for removal of particulate matter by line 24. The sulfur oxides generated by the combustion of coke in vessels 14 and 22 are removed by the sulfur oxide absorbents on the particles of the cracking catalyst in vessel 22.

Referring to FIG. 2, the oxygen concentration in the metals deactivation vessel 14 is at a minimal level to zero level and the concentration of carbon monoxide is high, within the range of from about 4 to about 14 volume percent, preferably from about 8 to about 14 volume percent, most preferably at about 10 volume percent. Coke deposits on the coked catalyst before regeneration can range from about 0.7 weight percent to about 5.0 weight percent. Typically the coke deposits on the coked catalyst are reduced from a range of about 0.7 weight percent to about 5.0 weight percent to a range from about 0.01 weight percent to about 0.5 weight percent. The temperature in the metals deactivation vessel 14 is within the range from about 900° F. to 1,450° F., preferably in the range from about 1,100° F. to about 1,450° F. and most preferably within the range from about 1,200° F. to about 1,450° F. Temperature in the regenerator vessel 22 is in the range from about 900° F. to about 1,600° F., preferably in the range from about 1,100° F. to about 1,600° F., and most preferably in the range from about 1,200° F. to about 1,600° F. Temperatures higher than 1,600° F. can also be used.

Accordingly, the invention comprises a process for the fluid catalytic cracking of hydrocarbon feedstocks containing metal compounds and organic sulfur compounds wherein the sulfur content of said feedstock is in the range from about 0.1 weight percent to about 12 percent, wherein metal deposits on the used cracking catalyst are deactivated in sufficient amounts to reduce hydrogen and coke formation during said cracking, sulfur oxide emissions from sulfur-containing coke deposits on the used cracking catalyst are reduced in amount, coke deposits on the used cracking catalyst are reduced in amount sufficiently by regeneration whereby the said catalyst is suitable for re-use, which process comprises (a) cracking said feedstock at a temperature from about 850° F. to about 1500° F. in a reaction zone in contact with fluidized solid particles, the said particles comprising a cracking catalyst and at least one metallic reactant in the same or different ones of said solid particles, said metallic reactant consisting essentially of one or more members selected from the group consisting of sodium, scandium, titanium, chromium, molybdenum, manganese, cobalt, nickel, antimony, copper, zinc, cadmium, the rare earth metals, lead, their compounds and mixtures thereof, and wherein said metallic reactant is present in sufficient amount to effect a reduction of at least 50% of the sulfur oxides produced by oxidation of the sulfur-containing coke deposits; (b) withdrawing of said particles from said reaction zone; (c) subjecting said particles to a reducing zone wherein carbon monoxide from limited combustion of said sulfur-containing coke deposits is present in a concentration from about 4 to 14 volume percent; (d) withdrawing said particles from said reducing zone; (e) subjecting the said particles to an oxidizing zone containing sufficient oxygen to raise the excess molecular oxygen in the flue gas emitted from said oxidizing zone to over 0.1 volume percent and wherein the carbon monoxide content in said flue gas is less than about 4 volume percent; and (f) withdrawing the said particles from said oxidizing zone whereby the said particles are in a condition suitable for re-use in the said reaction zone.

In summary, the invention comprises a fluid catalyst cracking process for cracking residuum and other heavy oils containing contaminant metals and sulfur to valuable products wherein the heavy oil feedstock is (a) cracked, (b) contaminant metals which deposit on the catalyst are deactivated and (c) sulfur oxides produced during catalyst regeneration are absorbed on the cracking catalyst in sufficient amount to effect a reduction of sulfur oxides in the flue gas.

The present invention has been illustrated with respect to catalytic cracking of a residual oil. However, it should be understood that the improved method and means of this invention can be applied generally for hydrocarbon conversion, and that the illustration of the the invention is not intended to limit the scope of the invention.

EXAMPLE I

A sample of a cracking catalyst obtained from a fluid catalytic cracking unit was analyzed and properties determined. After analysis, the catalyst was used in cracking residual oils and thereupon analyzed again. The results as to Sample 378-02 are in the following Table I.

TABLE 1

| | Before Resid Cracking | After Resid Cracking |
|---|---|---|
| Support Type | | |
| Cracking Activity, RMA[a] | 110 | 65 |
| Carbon Factor (CF) | 1.4 | 3.85 |
| Surface Area, m²/g | 75 | 66 |
| Pore Volume, cc/g | 0.26 | 0.27 |
| Metals Analysis (weight ppm) | | |
| Nickel | 185 | 3600 |
| Vanadium | 135 | 6600 |
| Iron | 3800 | 4400 |
| Alumina Content, Wt. % | 43.3 | 43.3 |
| Sieve Type | RE-Y | RE-Y |
| Medium Pore Radius, A | 132 | 133 |

TABLE I-continued

|  | Before Resid Cracking | After Resid Cracking |
|---|---|---|
| (Based on Volume) | | |

Note: (a)Relative Micro Activity

Carbon factor is defined as relative coke producing activity of the catalyst relative to a standard catalyst at the same gas oil volume percent conversion.

The metals contaminated catalyst was exposed to numerous cracking cycles in a gas oil reducing atmosphere wherein the reducing temperature was varied between 950° F. and 1,050° F. Samples of the catalyst were analyzed by standard microcracking procedures. Results are detailed in Table II.

TABLE II

Regeneration - Gas Oil Atmosphere

| Pilot Plant Run No. Sample No. | No. of Oxidizing Reducing Cycles | Reducing Temp., °F. | MCU Run No. | RMA | C.F. |
|---|---|---|---|---|---|
| 5376-02 | | | | | |
| 03 | 14 | 950 | 76-593 | 61 | 4.15 |
| 04 | 42 | " | 76-495 | 53 | 3.78 |
| 05 | 132 | " | 76-497 | 63 | 3.37 |
| 07 | 254 | " | 76-597 | 62 | 3.75 |
| 09 | 393 | " | 76-654 | 60 | 3.78 |
| 5376-04 | | | | | |
| 01 | 39 | 950 | 77-94 | 61 | 3.49 |
| 05 | 279 | " | 77-61 | 55 | 3.55 |
| 06 | 500 | " | 77-62 | 58 | 3.33 |
| 08 | 1000 | " | 77-83 | 57 | 3.41 |
| 09 | 1512 | " | 77-85 | 65 | 3.11 |
| 10 | 2047 | " | 77-80 | 58 | 3.33 |
| 5377-01 | | | | | |
| 03 | 30 | 950 | 113D | 57 | 3.98 |
| 07 | 99 | " | 77-161 | 62 | 3.32 |
| 08 | 265 | " | 77-162 | 62 | 3.23 |
| 09 | 504 | " | 77-166 | 52 | 3.07 |
| 10 | 767 | " | 77-167 | 50 | 3.16 |
| 11 | 1006 | " | 77-212 | 45 | 3.35 |
| 5378-02 | | | | | |
| 02 | 115 | 1050 | 111A | 54 | 3.62 |
| 05 | 374 | " | 109B | 57 | 3.48 |
| 07 | 615 | " | 108D | 57 | 3.25 |
| 08 | 880 | " | 107B | 65 | 2.91 |
| 09 | 1051 | " | 111C | 65 | 2.64 |
| 11 | 1230 | " | 114A | 60 | 293 |
| Control 378-02 | 0 | — | 76-493 | 63.8 | 3.80 |
| Control 378-02 | 0 | — | 76-494 | 58.8 | 3.92 |

The above results indicate that the rate of metals deactivation increases as the temperature of the reducing atmosphere increases.

EXAMPLE II

Samples of the catalyst of Example I were exposed to cycles of hydrogen and air and to apply hydrogen for six hours at 1200° F. Each cycle consisted of a five-minute purge of nitrogen, a five-minute air oxidation, a five-minute purge of nitrogen and a five-minute hydrogen reduction. Results are in Table III.

TABLE III 378-02 Catalyst After Hydrogen Regeneration

| Treatment | RMA | CF |
|---|---|---|
| Control | 65 | 3.90 |
| 6-Hr in Hydrogen at 1200° F. | 62 | 3.80 |
| 10 Cycles-Air/Hydrogen at 1200° F. | 78 | 3.20 |

TABLE III-continued 378-02 Catalyst After Hydrogen Regeneration

| Treatment | RMA | CF |
|---|---|---|
| 20 Cycles-Air/Hydrogen at 1200° F. | 81 | 2.93 |

The above results indicate significant deactivation of contaminant metals occurs with 10 to 20 cycles of oxidation/reduction cycles and that both oxidizing and reducing atmospheres at high temperature are required for rapid deactivation.

No significant deactivation was shown by a 1200° F. reducing atmosphere alone, thus indicating both oxidizing and reducing cycles are necessary for metals deactivation.

EXAMPLE III

Samples of the catalyst of Example I were exposed to cycles of carbon monoxide and air at 1200° F. Each cycle consisted of a 5-minute purge with nitrogen, a 5-minute air oxidation, a 5-minute purge with nitrogen and a 5-minute carbon monoxide reduction. Results are in Table IV.

TABLE IV 378-02 Catalyst After Carbon Monoxide Regeneration

| Treatment | RMA | CF |
|---|---|---|
| Control | 65 | 3.90 |
| 10 Cycles-Carbon Monoxide/Air at 1200° F. | 63 | 3.3 |
| 25 Cycles-Carbon Monoxide/Air at 1200° F. | 78 | 3.0 |

The above results indicate that carbon monoxide is an effective reducing agent for the deactivation of contaminant metals.

What is claimed is:

1. A process for the fluid catalytic cracking of hydrocarbon feedstocks containing metal compounds and organic sulfur compounds wherein the sulfur content of said feedback is in the range from about 0.1 weight percent to about 12 weight percent, wherein (i) metal deposits on the used cracking catalyst are deactivated in sufficient amounts to reduce hydrogen and coke formation during said cracking, (ii) sulfur oxide emissions from sulfur-containing coke deposits on the used cracking catalyst are reduced in amount, (iii) coke deposits on the used cracking catalyst are reduced in amount sufficiently by regeneration whereby the said catalyst is suitable for re-use, which process comprises;

(a) cracking said feedstock at a temperature from about 850° F. to about 1500° F. in a reaction zone in contact with fluidized solid particles, the said particles comprising a cracking catalyst and at least one metallic reactant in the same or different ones of said solid particles, said metallic reactant consisting essentially of one or more members selected from the group consisting of sodium, scandium, titanium, chromium, molybdenum, manganese, cobalt, nickel, antimony, copper, zinc, cadmium, the rare earth metals, lead, their compounds and mixtures thereof, and wherein said metallic reactant is present in sufficient amount to effect a reduction of at least 50% of the sulfur oxides produced by oxidation of the sulfur-containing coke deposits;

(b) withdrawing of said particles from said reaction zone;

(c) subjecting said particles to a reducing zone wherein carbon monoxide from limited combustion of said sulfur-containing coke deposits is present in a concentration from about 4 to 14 volume percent;

(d) withdrawing said particles from said reducing zone;

(e) subjecting the said particles to an oxidizing zone containing sufficient oxygen to raise the excess molecular oxygen in the flue gas emitted from said oxidizing zone to over 0.1 volume percent and wherein the carbon monoxide content in said flue gas is less than about 4 volume percent;

(f) withdrawing the said particles from said oxidizing zone whereby the said particles are in a condition suitable for re-use in the said reaction zone.

2. The process of claim 1 wherein the said metal compounds of said hydrocarbon feedstocks comprise at least one metal selected from the group consisting of nickel, vanadium, copper and iron in concentrations up to 50 ppm of nickel, 100 ppm of vanadium, 50 ppm of copper and 200 ppm of iron.

3. The process of claim 1 wherein the said metal deposits on said used cracking catalyst are present in concentrations of up to 10,000 ppm of nickel, 10,000 ppm of vanadium, 10,000 ppm of iron and 5,000 ppm of copper, individually and as mixtures thereof.

4. The process of claim 1 wherein said particles comprising a cracking catalyst are selected from the group of cracking catalysts consisting of an amorphous silica-alumina type having an alumina content of about 10 to about 65 weight percent, a silica-magnesia type having a magnesia content of up to about 20 weight percent and a zeolite-type which comprises from about 0.5 to about 50 weight percent of a crystalline aluminosilicate component distributed throughout a porous matrix.

5. The process of claim 1 wherein the temperature of said reducing zone is within the range of from about 900° F. to about 1,450° F.

6. The process of claim 1 wherein the temperature of the said reducing zone is within the range of from about 1100° F. to about 1450° F.

7. The process of claim 1 wherein the temperature of the said reducing zone is within the range of from about 1200° F. to about 1450° F.

8. The process of claim 1 wherein the concentration of said carbon monoxide in said reducing zone is from about 8 to about 14 volume percent.

9. The process of claim 1 wherein the concentration of said carbon monoxide in said reducing zone is at about 10 volume percent.

10. The process of claim 1 wherein the said sulfur-containing coke deposits as coke on the said solid particles of the used cracking catalyst before regeneration are within the range of from about 0.7 to 5.0 weight percent.

11. The process of claim 1 wherein the said coke deposits on the used cracking catalyst are reduced in an amount by regeneration from a range of about 0.7 weight percent to about 5.0 weight percent to a range from about 0.01 weight percent to about 0.5 weight percent.

12. The process of clam 1 wherein the temperature of the said oxidizing zone is in the range of from about 900° F. to about 1600° F.

13. The process of claim 1 wherein the said excess molecular oxygen in flue gas emitted from said oxidizing zone is over 1.0 volume percent.

14. The process of claim 1 wherein the said reducing zone and the said oxidizing zone are in the same vessel.

15. The process of claim 1 wherein the said reducing zone is in a metals deactivation vessel and the said oxidizing zone is in a regenerator vessel.

16. The process of claim 1 wherein the said metallic reactant consists of at least one free or combined metallic element selected from the group consisting of sodium, chromium, manganese, copper, zinc and cadmium.

17. The process of claim 1 wherein the said metallic reactant consists of at least free or combined metallic element selected from the group consisting of sodium, manganese and copper.

18. The process of claim 1 wherein the said hydrocarbon feedstock comprises at least one component selected from the group consisting of atmospheric residua, vacuum residua, whole crudes, visbreaker tar, bottoms of catalytically cracked gas oil and shale oil.

* * * * *

UNITED STATES PATENT OFFICE
CERTIFICATE OF CORRECTION

Patent No. 4280898                    Dated July 28, 1981

Inventor(s)    David F. Tatterson and Iacovos A. Vasalos

It is certified that error appears in the above-identified patent and that said Letters Patent are hereby corrected as shown below:

In Table 1

At Column 10, line 69, delete "Medium Pore Radius, A   132   133"

At Column 11, line 5, "(Based on Volume)" should read

--Medium Pore Radius, Å         132         133
        (Based On Volume)                          --.

At Column 11, line 57, "apply" should read --only--.

Signed and Sealed this

Twenty-seventh Day of October 1981

[SEAL]

Attest:

GERALD J. MOSSINGHOFF

Attesting Officer        Commissioner of Patents and Trademarks